United States Patent
Lomnitz et al.

(10) Patent No.: US 7,720,166 B2
(45) Date of Patent: May 18, 2010

(54) SYSTEM, METHOD AND DEVICE OF DECODING SPATIALLY MULTIPLEXED SIGNALS

(75) Inventors: Yuval Lomnitz, Herzelia (IL); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 987 days.

(21) Appl. No.: 11/392,931

(22) Filed: Mar. 30, 2006

(65) Prior Publication Data

US 2007/0230631 A1    Oct. 4, 2007

(51) Int. Cl.
*H04L 23/02* (2006.01)
*H04L 5/12* (2006.01)

(52) U.S. Cl. .............. 375/262; 375/263; 375/264; 375/341

(58) Field of Classification Search ........ 375/310, 375/340, 267, 259, 262, 265, 295; 714/792, 714/795
See application file for complete search history.

(56) References Cited

U.S. PATENT DOCUMENTS

| | | | |
|---|---|---|---|
| 6,154,507 A * | 11/2000 | Bottomley | 375/340 |
| 6,662,024 B2 | 12/2003 | Walton et al. | |
| 6,834,088 B2 * | 12/2004 | Agami et al. | 375/324 |
| 6,891,897 B1 | 5/2005 | Bevan et al. | |
| 2004/0047438 A1 * | 3/2004 | Zhuang et al. | 375/340 |
| 2004/0091039 A1 * | 5/2004 | Xia et al. | 375/233 |
| 2004/0261004 A1 * | 12/2004 | Asghar et al. | 714/794 |
| 2005/0003863 A1 | 1/2005 | Gorokhov | |
| 2006/0029124 A1 * | 2/2006 | Grant et al. | 375/148 |

OTHER PUBLICATIONS

Bottomley et al. "Adaptive Arrays and MLSE Equalization" IEEE, 1995, pp. 50-54.
Foschini, "Layered Space-Time Architecture for Wireless Communication in a Fading Environment When Using Multi-Element Antennas", Bell Labs Technical Journal, 1996, pp. 41-60.
Hassibi et al. "The Expected Complexity of Sphere Decoding. I. Theory", pp. 1-30, Department of Electrical Engineering, California Institute of Technology, Pasadena, CA.
Higuchi et al. "Likelihood Function for QRM-MLD Suitable for Soft-Decision Turbo Decoding and Its Performance for OFCDM MIMO Multiplexing in Mulitipath Fading Channel", IEEE, 2004, pp. 1142-1148.
Kim et al. "Joint Detection and Channel Estimation Algorithms for QS-CDMA Signals Over Time-Varying Channels", IEEE-Transactions on Communications, vol. 50 No. 5, May 2002, pp. 845-855.
Liu et al. "Near-Optimum Soft Decision Equalization for Frequency Selective MIMO Channels", IEEE Transactions on Signal Processing, vol. 52, No. 3, Mar. 2004, pp. 721-733.

(Continued)

*Primary Examiner*—Chieh M Fan
*Assistant Examiner*—Qutbuddin Ghulamali
(74) *Attorney, Agent, or Firm*—Pearl Cohen Zedek Latzer, LLP

(57) ABSTRACT

Embodiments of the present invention provide a method, apparatus and system of decoding spatially multiplexed signals. In some demonstrative embodiments the method may include, for example, determining one or more hypothetical values of a transmitted signal of a set of transmitted signals based on one or more respective sets of hypothetical values assigned to a subset of the set of transmitted signals. Other embodiments are described and claimed.

17 Claims, 6 Drawing Sheets

OTHER PUBLICATIONS

Wolniansky et al. "V-Blast: An Architecture for Realizing Very High Data Rates Over the Rich-Scattering Wireless Channel", Bell Laboratories, Lucent Technologies, Crawford Hill Laboratory, NJ, USA, pp. 1-6.

Van Zelst, "Per-Antenna-Coded Schemes for MIMO OFDM" IEEE, 2003, pp. 2832-2836.

Alamouti, "A Simple Transmit Diversity Technique for Wireless Communications", IEEE Journal on Select Areas in Communications, vol. 16, No. 8, Oct. 1998, pp. 1451-1458.

International Search Report and Written Opinion of Application No. PCT/US2007/064565 Mailed August 7, 2007.

\* cited by examiner

SYSTEM, METHOD AND DEVICE OF DECODING SPATIALLY MULTIPLEXED SIGNALS

BACKGROUND OF THE INVENTION

A wireless communication system may include a first station able to communicate with a second station over a communication channel. In a spatial multiplexing communication system the first station may include a transmitter to transmit parallel streams representing a message via a plurality of transmit antennas ($N_{TX} > 1$). The second station may include a receiver to receive a plurality of symbols corresponding to the transmitted streams via a plurality of receive antennas ($N_{RX} \geq N_{TX}$).

The receiver may include an equalizer to decode the received symbols, which may be a mixture of the transmitted symbols, into metrics (LLRs). The receiver may also include a Maximum Likelihood Sequence Estimation (MLSE) decoder, e.g., a turbo decoder or a viterbi decoder, to determine an estimation of the message based on the metrics.

The equalizer may determine the metrics based on a Maximum Likelihood Decoding (MLD) algorithm, which may include scanning all constellation points of all the $N_{Tx}$ transmit antennas. Accordingly, the MLD algorithm may have a complexity of $M^{N_{Tx}}$, wherein M denotes a constellation size implemented by the transmitter. For example, if $N_{TX}=2$, and M=64, then the MLD algorithm may have a complexity of 4096.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
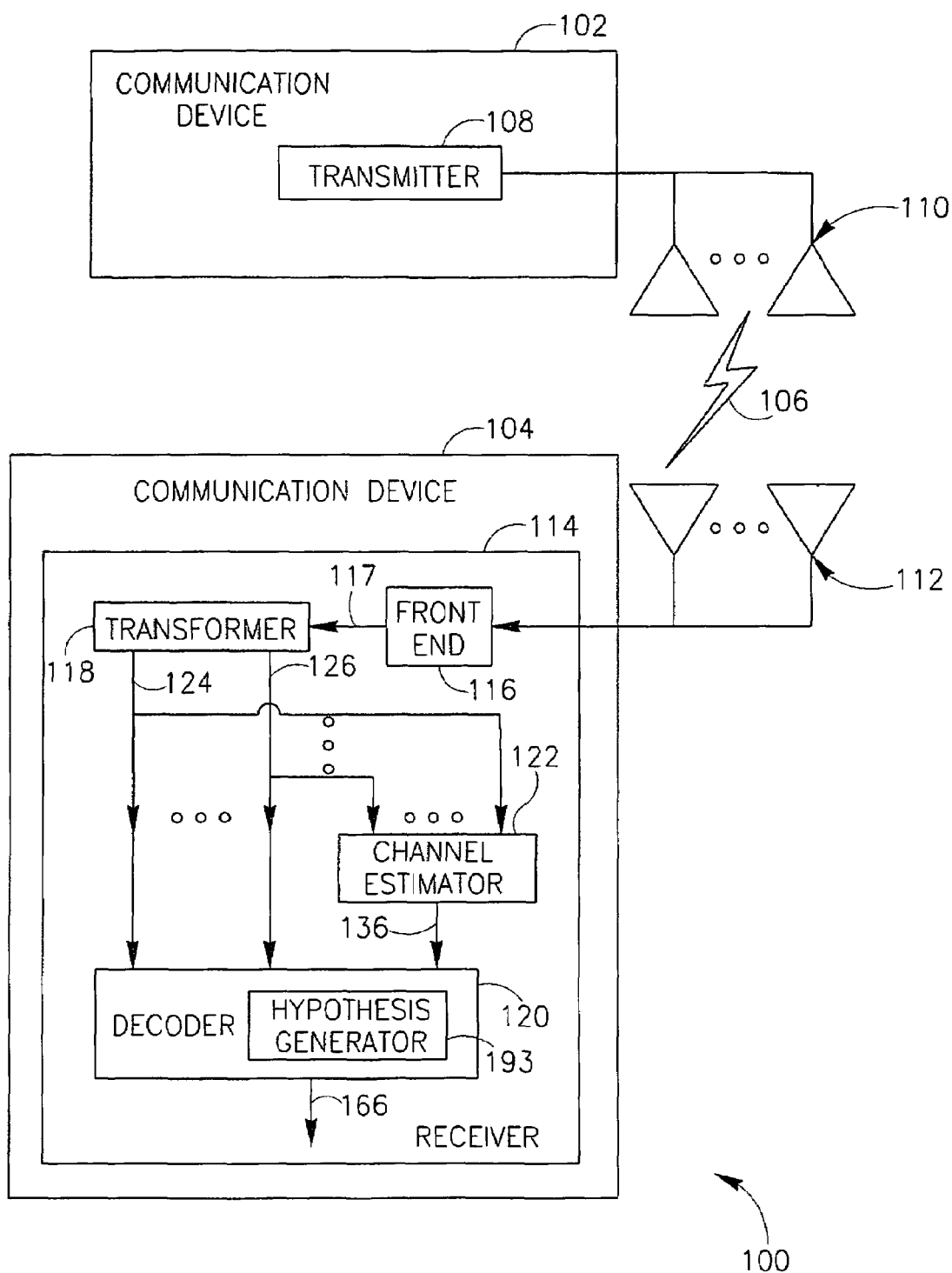
FIG. 1 is a schematic illustration of a wireless communication system in accordance with some demonstrative embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, parameters, or the like. For example, "a plurality of signals" may include two or more signals.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

It should be understood that the present invention may be used in a variety of applications. Although the present invention is not limited in this respect, the circuits and techniques disclosed herein may be used in many apparatuses such as units of a wireless communication system, for example, a Wireless Local Area Network (WLAN) system, a Wireless Metropolitan Area Network (WMAN) communication system, and/or in any other unit and/or device. Units of a communication system intended to be included within the scope of the present invention include, by way of example only, modems, Mobile Units (MU), Access Points (AP), wireless transmitters/receivers, and the like.

Types of WLAN and/or WMAN communication systems intended to be within the scope of the present invention include, although are not limited to, WLAN and/or WMAN communication systems as described by "IEEE-Std 802.16, 2004 Edition, Air Interface for Fixed Broadband Wireless Access Systems" standard ("the 802.16 standard"), and more particularly in "IEEE-Std 802.16e, 2005 Edition, Physical and Medium Access Control Layers for Combined Fixed and Mobile Operation in Licensed Bands", and the like.

Although the scope of the present invention is not limited in this respect, the circuits and techniques disclosed herein may also be used in units of wireless communication systems, digital communication systems, satellite communication systems and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), or a global communication network, for example, the Internet.

Part of the discussion herein may relate, for exemplary purposes, to receiving and/or decoding a signal. However, embodiments of the invention are not limited in this regard, and may include, for example, receiving and/or decoding a symbol, a block, a data portion, a packet, a data sequence, a frame, a data signal, a preamble, a signal field, a content, an item, a message, a protection frame, a transmission or the like.

Reference is made to FIG. 1, which schematically illustrates a wireless communication system 100 in accordance with some demonstrative embodiments of the present invention.

According to some demonstrative embodiments of the invention, communication system 100 may include a WLAN/WMAN system. System 100 may include a first communication device 102 able to communicate with a second communication device 104 over a communication channel 106. For example, device 102 and/or device 104 may include a station, e.g., in accordance with the 802.16 standard.

According to some demonstrative embodiments of the invention, device 102 may include $N_{Tx}$ antennas 110, and/or device 104 may include $N_{Rx}$ antennas 112 to transmit and/or receive symbols, e.g., over channel 106, wherein $N_{Rx} \geq N_{Tx} \geq 2$. Although the scope of the present invention is not limited in this respect, types of antennae that may be used for antennas 110 and/or 112 may include but are not limited to internal antenna, dipole antenna, omni-directional antenna, a monopole antenna, an end fed antenna, a circularly polarized antenna, a micro-strip antenna, a diversity antenna and the like.

According to some demonstrative embodiments of the invention, communication device 102 may include a transmitter 108 to transmit a spatially-multiplexed transmission by transmitting set of $N_{Tx}$ signals via $N_{Tx}$ antennas 110, respectively, e.g., as is known in the art. In one example, transmitter 108 may perform horizontal encoding to encode the transmission, for example, by using $N_{Tx}$ Forward Error Correction (FEC) encoders to generate the set of $N_{Tx}$ transmitted signals, respectively, e.g., as is known in the art. In another example, transmitter 108 may perform vertical encoding to encode the transmission, for example, by generating the set of $N_{Tx}$ transmitted signals based on an output of a single FEC encoder.

According to some demonstrative embodiments of the invention, one or more of the transmitted signals may include one or more Orthogonal Frequency Division Multiple Access (OFDMA) symbols modulated over one or more subcarriers, e.g., as is known in the art. For example, a signal of the transmitted signals may include a plurality of Quadrature Amplitude Modulation (QAM) symbols modulated over a plurality of subcarriers, as is known in the art. The QAM symbols may include, for example, symbols selected from a constellation of a size M (the "M-ary constellation"), as is known in the art. For example, the QAM symbols may include 2-QAM symbols, Quadrature Phase Shift Key (QPSK) symbols, 8-QAM symbols, 16-QAM symbols, 64-QAM symbols, and/or any other suitable symbols, e.g., as are known in the art.

According to some demonstrative embodiments of the invention, communication device 102 may use a subcarrier permutation for communicating with device 104. The permutation may include, for example, a predefined set of subcarriers, e.g., selected from a plurality of available subcarriers. Communication device 102 may use one or more other permutations for communicating with one or more other devices, e.g., as is known in the art.

According to some demonstrative embodiments of the invention, communication device 104 may include a receiver 114 to receive signals over channel 106. For example, receiver 114 may receive a set of $N_{Rx}$ time-domain signals via $N_{Rx}$ antennas 112, respectively. The received signals may include symbols modulated over the subcarrier permutation of device 104, e.g., as is known in the art. The $N_{Rx}$ received signals may include symbols corresponding, for example, to symbols of the signals transmitted by transmitter 108.

According to some demonstrative embodiments of the invention, receiver 114 may include a front end 116 and/or a transformer 118, e.g., as are known in the art. Front end 116 may include any suitable front end module to convert the time-domain signals received from antennas 112 into time-domain signals 117 of a format suitable for transformer 118, as known in the art. Transformer 118 transform signals 117 into a plurality of frequency-domain signals, e.g., including signals 124 and 126. Transformer 118 may include, for example, a Fast Fourier Transformation (FFT) module, e.g., as is known in the art.

According to some demonstrative embodiments of the invention, receiver 114 may also include a channel estimator 122 to generate, based on the frequency-domain signals provided by transformer 118, a plurality of signals 136 representing a plurality of channel estimations of the plurality of subcarriers, respectively, e.g., as is known in the art. For example, a channel corresponding to a subcarrier of the plurality of subcarriers may be represented, for example, by a channel matrix, denoted H, e.g., a $N_{RX} \cdot N_{TX}$ matrix s is known in the art.

According to some demonstrative embodiments of the invention, receiver 114 may also include a decoder 120 to decode the received signals and to generate signals 166 representing an estimation of the signals transmitted by device 102, e.g., as described in detail below. In some demonstrative embodiments of the invention, decoder 120 may be able to perform "hard-decoding" of the received signals, e.g., as described below with reference to FIGS. 2, 3, and/or 4. In another demonstrative embodiment of the invention, decoder 120 may be able to perform "soft-decoding" of the received signals, e.g., as described below with reference to FIGS. 5 and/or 6. However, the invention is not limited in this respect, and in other embodiments of the invention decoder 120 may be able to perform any suitable decoding operation, e.g., including one or more "soft-decoding" operations, "hard-decoding" operations, any other decoding operations, and/or any combination thereof.

According to some demonstrative embodiments of the invention, decoder 120 may include a hypothesis generator 193 to determine at least one hypothetical value of a selected signal of the set of $N_{Tx}$ transmitted signals based on at least one respective set of hypothetical values assigned to a subset of the set of the $N_{Tx}$ transmitted signals, respectively, e.g., as described in detail below. In some demonstrative embodiments of the invention, decoder 120 may determine signals 166 based on the at least one hypothetical value of the selected signal, and/or the at least one set of hypothetical values, e.g., as described in detail below.

According to some embodiments, receiver 114 and/or transmitter 108 may be implemented, for example, using separate and/or integrated units, for example, using a transmitter-receiver or transceiver.

The set of signals received by receiver 114 over a subcarrier of the subcarrier permutation of device 104, may be represented, for example, as follows:

$$\underline{y} = H\underline{s} + \underline{v} \quad (1)$$

wherein $\underline{y}$ denotes a $[N_{Rx} \times 1]$ vector representing the $N_{Rx}$ respective signals received over $N_{Rx}$ antennas 112, respectively; $\underline{s}$ denotes a $[N_{Tx} \times 1]$ vector including $N_{Tx}$ symbols of an M-ary constellation transmitted via $N_{Tx}$ antennas 110, respectively; and $\underline{v}$ denotes a $[N_{Rx} \times 1]$ vector representing noise, e.g., Independently and Identically Distributed (IID) noise.

A set of estimated values of $\underline{s}$, denoted $\hat{s}$, may be determined, for example, by the following Maximum Likelihood (ML) solution of Equation 1:

$$\hat{\underline{s}} = \underset{s \in S}{\operatorname{argmax}} \, Pr(\underline{y} \mid \underline{s}) = \underset{s \in S}{\operatorname{argmin}} \| \underline{y} - H\underline{s} \|^2 \quad (2)$$

wherein S denotes a group of combinations of M constellation points over $N_{Tx}$ antennas 110; and wherein the notation $\|w\|^2$ denotes a $L_2$ norm operation applied to the parameter w, i.e., $\|w\|^2 \equiv w^*w$. However, it will be appreciated by those of ordinary skill in the art that the solution of Equation 2 may require, for example, scanning $M^{N_{Tx}}$ hypothesis values of $\underline{s}$.

According to some demonstrative embodiments of the invention, a set of hypothetical values may be assigned to a selected subset of the $N_{Tx}$ transmitted signals, including a number of signals smaller than $N_{Tx}$; and a hypothetical value of at least one selected signal of the $N_{Tx}$ transmitted signals, e.g., a signal not included in the selected subset of signals, may be determined based on the set of assigned hypothetical values. For example, a set of $N_{Tx-1}$ hypothetical values, denoted $\underline{s}_R$, may be assigned to a selected subset including $N_{Tx-1}$ signals of the $N_{Tx}$ transmitted signals, respectively. A hypothetical value of the selected signal, denoted $\hat{s}_1(\underline{s}_R)$, may be determined, for example, based on the set $S_R$, e.g., as described below.

It will be appreciated by those of ordinary skill in the art that a ML Sequence Estimation (MLSE), denoted s', of a single encoded stream of symbols, denoted s, transmitted from a single antenna and received by one or more antennas may be implemented by a combination of a Maximal Ratio Combiner (MRC) followed by a MLSE decoder. If the encoded stream includes symbols selected from a discrete constellation, the MLSE decoder may be implemented by a slicer, as is known in the art. For example, the estimation of s' may be determined as follows:

$$s' = \underset{s \in Q}{\operatorname{argmin}} \| y - h \cdot s \|^2 = \underset{s \in Q}{\operatorname{argmin}} (\|y\|^2 - 2 \cdot \operatorname{Re}[y \cdot h^* \cdot s^*] + \|h\|^2 \cdot |s|^2) = \quad (3)$$
$$= \underset{s \in Q}{\operatorname{argmin}} [(h^*h) \cdot |(h^*h)^{-1} h^* y - s|^2 + \|y\|^2 - (h^*h)^{-1} |h^* y|^2] =$$
$$= \underset{s \in Q}{\operatorname{argmin}} |(h^*h)^{-1} \cdot h^* \cdot y - s|^2 = \operatorname{slice}((h^* \cdot h)^{-1} \cdot h^* \cdot y)$$

wherein y denotes a received stream corresponding to the stream s, h denotes a channel between the transmitting antenna and the receiving antennas, and Q denotes a predefined group of constellation points.

It will also be appreciated by those of ordinary skill in the art that a ML estimation of first and second parameters, denoted θ1 and θ2, respectively, may be performed by determining a ML estimation of θ2 for a given value of θ1, and determining the value of θ1 which may maximize the ML estimation of θ2, for example, as follows:

$$\underset{(\theta 1, \theta 2)}{\max}(L(\theta 1, \theta 2)) = \underset{\theta 1}{\max} \left[ \underset{\theta 2}{\max}(L(\theta 1, \theta 2)) \right] \quad (4)$$

wherein L(θ1, θ2) denotes a log-likelihood of the received signal as a function of the parameters θ1 and θ2.

According to some demonstrative embodiments of the invention, the value of $\hat{s}_1(\underline{s}_R)$ corresponding to the set of hypothetical values $\underline{s}_R$ may be determined by applying a predefined function to the set of hypothetical values $\underline{s}_R$, the received signals $\underline{y}$, and/or the channel estimation H, e.g., as described below.

According to some demonstrative embodiments of the invention, the ML estimation of the values of s corresponding to the values $\underline{y}$ may be equivalent to determining a ML estimation of $\hat{s}_1(\underline{s}_R)$ based on the set of assigned values $\underline{s}_R$; and determining the values of $\underline{s}_R$ which may maximize the log-likelihood of $\underline{y}$ for $\hat{s}_1(\underline{s}_R)$, e.g., as follows:

$$\hat{s}_1(\underline{s}_R) = \underset{s_1}{\operatorname{argmax}}\{Pr(\underline{y}; s_1, \underline{s}_R)\} \quad (5)$$
$$Pr(\underline{y}; \underline{s}_R, \hat{s}_1(\underline{y}, \underline{s}_R)) \underset{\hat{s}_R}{\rightarrow} \max$$

According to some demonstrative embodiments of the invention, a hypothetical value, denoted x, of a contribution of the hypothetical value $\hat{s}_1(\underline{s}_R)$ to the received signal $\underline{y}$ may be determined, for example, by subtracting a contribution of the set of hypothetical values $\underline{s}_R$ from the received signal $\underline{y}$. For example, the value x may be determined as follows:

$$x = \underline{y} - H_R \underline{s}_R \quad (6)$$

wherein $H_R$ denotes one or more portions, e.g., columns, of the matrix H corresponding to the selected subset of signals.

According to some demonstrative embodiments of the invention, the value of $\hat{s}_1(\underline{s}_R)$ may be determined by applying a MRC operation to the value of x, and applying a slicing operation to the result of the MRC operation. For example, the value of $\hat{s}_1(\underline{s}_R)$ may be determined based on the following equation, which may be derived by substituting y with x, and h with $H_1$ in Equation 3:

$$\hat{s}_1(\underline{s}_R) = \text{slice } [(H_1^* H_1)^{-1} H_1^* (\underline{y} - H_R \underline{s}_R)] \quad (7)$$

wherein $H_1$ denotes a portion, e.g., a column, of the matrix H corresponding to the selected signal.

According to some demonstrative embodiments of the invention, hypothesis generator 193 may determine the value $\hat{s}_1(\underline{s}_R)$ according to Equation 7.

According to some demonstrative embodiments of the invention, decoder 120 may assign a plurality of sets of hypothetical values $\underline{s}_R$ to the selected subset of signals, and hypothesis generator 193 may generate a plurality of hypothetical values $\hat{s}_1(\underline{s}_R)$ of the selected signal based on the plurality of sets of hypothetical values, respectively, e.g., as described below. Decoder 120 may also determine a plurality of vectors $\underline{s}$ including the plurality of sets of hypothetical values $\underline{s}_R$, respectively; and the plurality of hypothetical values $\hat{s}_1(\underline{s}_R)$, respectively. Decoder 120 may select one of the plurality vectors $\underline{s}$ ("the selected vector $\underline{s}$") based on any suitable criteria, e.g., as described below. Decoder 120 may generate signals 166 corresponding to the selected vector $\underline{s}$.

According to some demonstrative embodiments of the invention, decoder 120 may select the vector $\underline{s}$ based on a plurality of distance values, e.g., Euclidian distances, corresponding to the received signals $\underline{y}$, the plurality of hypothetical values $\hat{s}_1(\underline{s}_R)$, and/or the plurality of sets of hypothetical values $\underline{s}_R$, respectively. For example, decoder 120 may determine a plurality of distance values, denoted $d_{\underline{s}}^2$, corresponding to the plurality vectors $\underline{s}$, respectively, e.g., as follows:

$$d_{\underline{s}}^2 = \|\underline{y} - H\underline{s}\|^2 = \|\underline{y} - H_R \underline{s}_R - H_1 s_1\|^2 \quad (8)$$

According to some demonstrative embodiments of the invention, may decoder 120 select the vector $\underline{s}$ such that the selected vector $\underline{s}$ results in a minimal distance value, e.g., according to Equation 8, compared, for example, to the distance values resulting from other vectors, e.g., as described below.

Figure 2:
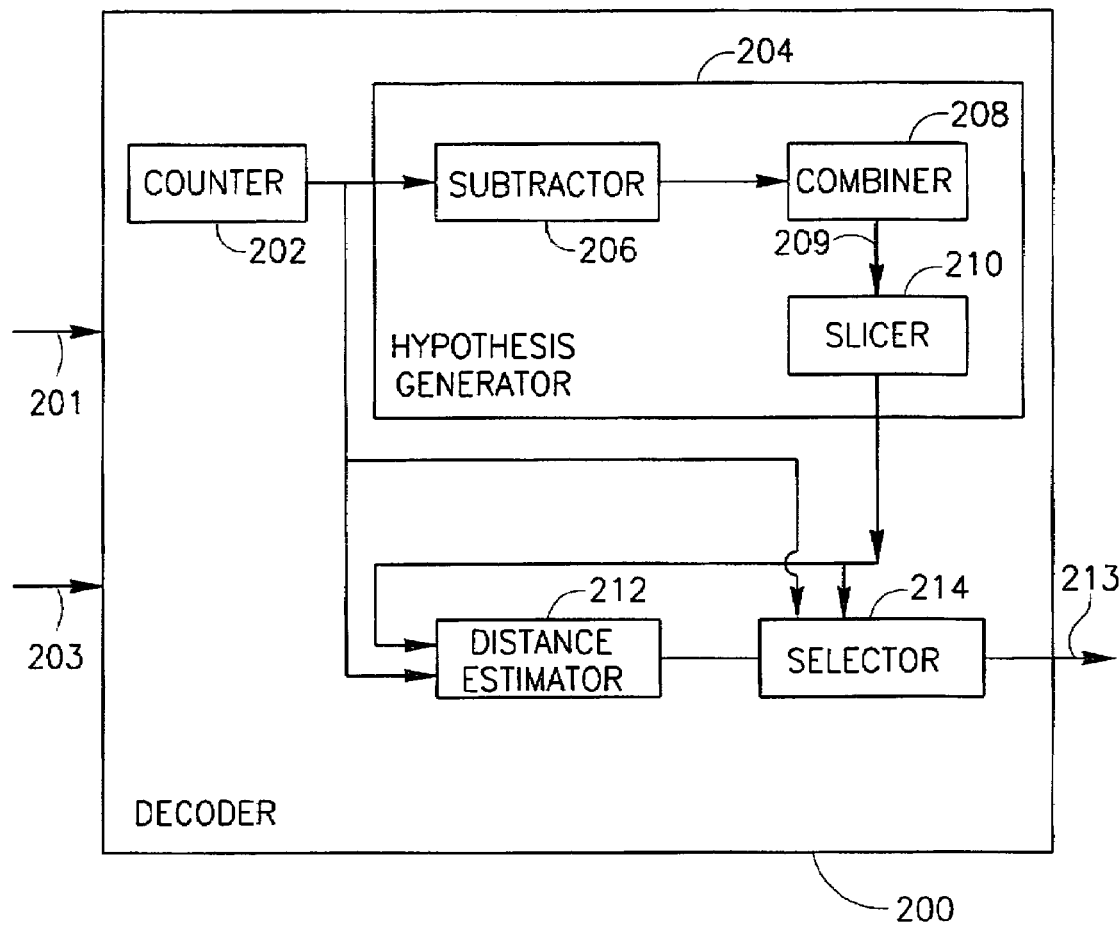
FIG. 2 is a schematic illustration of a decoder in accordance with one demonstrative embodiment of the invention.

Reference is now made to FIG. 2, which schematically illustrates a decoder 200 in accordance with one demonstrative embodiment of the invention. Although the invention is not limited in this respect, decoder 200 may perform the functionality of decoder 120 (FIG. 1). Although the invention is not limited in this respect, decoder 200 may be implemented, for example, to perform "hard-decoding" of the signals $\underline{y}$.

According to some demonstrative embodiments of the invention, decoder 200 may generate an output 213 including $\underline{s}$ values representing the transmitted signals, e.g., based on input 201 including received signals $\underline{y}$, and/or input 203 including the channel matrix H, as described in detail below.

According to some demonstrative embodiments of the invention, decoder 200 may include a counter 202, a hypothesis generator 204, a distance estimator 212, and/or a selector, as are described in detail below.

According to some demonstrative embodiments of the invention, counter 202 may include any suitable counter to assign one or more sets of hypothetical values $\underline{s}_R$ to the subset of $N_{Tx}$ transmitted signals, e.g., as described below. Hypothesis generator 204 may include any suitable generator to generate the hypothetical value $\hat{s}_1(\underline{s}_R)$ corresponding to the set of hypothetical values $\underline{s}_R$, e.g., in accordance with Equation 7. Although the invention is not limited in this respect, hypothesis generator 204 may include, for example, a subtractor 206 to generate the hypothetical value x, e.g., according to Equation 6; a combiner 208 to apply a MRC operation to the hypothetical value x; and/or a slicer 210 to apply a slicing operation to an output 209 of combiner 208. Combiner 208 may include any suitable MRC combiner, e.g., as is known in the art. Slicer 210 may include any suitable slicer, e.g., a QAM slicer as is known in the art. Distance estimator 212 may include any suitable estimator to estimate a distance value resulting from the set of hypothetical values $\underline{s}_R$, and the hypothetical value $\hat{s}_1(\underline{s}_R)$, e.g., according to Equation 8. Selector 210 may include any suitable selector to select the vector $\underline{s}$ by applying any suitable criteria to distance values determined by estimator 212, e.g., as described below. Although the invention is not limited in this respect, the $\underline{s}$ values of output 209 may substantially be equal to the values $\hat{s}$, e.g., according to Equation 2.

Some demonstrative embodiments of the invention are described herein in the context of a subtractor, e.g., subtractor 206, a combiner, e.g., combiner 208, and/or a slicer, e.g., slicer 210 being separate units of a hypothesis generator, e.g., generator 204; and/or a hypothesis generator, e.g., generator 204, a counter, e.g., counter 202, a distance estimator, e.g., estimator 212, and/or a selector, e.g., selector 214, being separate parts of a decoder, e.g., decoder 204. However, it will be appreciated by those skilled in the art that, according to other embodiments of the invention, the decoder, counter, hypothesis generator, subtractor, combiner, slicer, distance estimator, and/or selector may be implemented in any other suitable configuration and/or arrangement, e.g., as described below with reference to FIG. 4.

Figure 3:
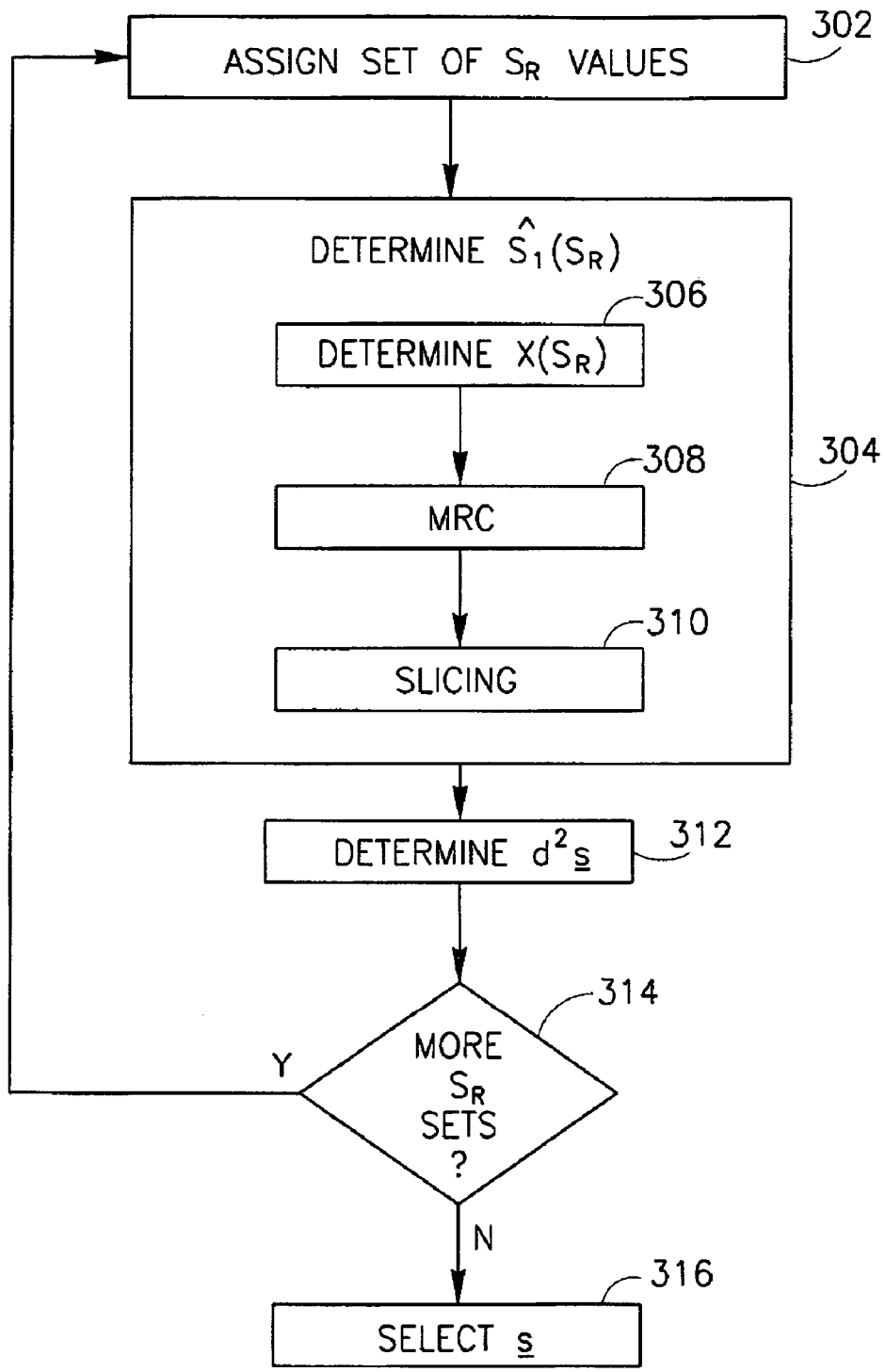
FIG. 3 is a schematic flow-chart illustration of a method of decoding received signals in accordance with some demonstrative embodiments of the invention.

Reference is also made to FIG. 3, which schematically illustrates a method of decoding received signals corresponding to a set of $N_{Tx}$ transmitted signals in accordance with some demonstrative embodiments of the invention. Although the invention is not limited in this respect, one or more operations of the method of FIG. 3 may be implemented by decoder 200, and/or hypothesis generator 204.

As indicated at block 302, the method may include assigning a set of one or more hypothetical values to a subset including one or more signals of the set of $N_{Tx}$ transmitted signals, respectively. For example, counter 202 may assign one or more hypothetical values $\underline{s}_R$ to one or more of the $N_{Tx}$ transmitted signals, respectively, e.g., as described above.

As indicated at block 304, the method may also include determining a hypothetical value of a selected signal of the $N_{Tx}$ transmitted signals based on the set of assigned hypothetical values. For example, hypothesis generator 204 may determine the value of $\hat{s}_1(\underline{s}_R)$, e.g., based on Equation 7.

According to some demonstrative embodiments of the invention, determining the hypothetical value of the selected signal may include determining the hypothetical value x based on the hypothetical values $\underline{s}_R$ and the received signals $\underline{y}$, for example, according to Equation 6, as indicated at block 306; applying a MRC operation to the hypothetical value x, e.g., as indicated at block 308; and/or applying a slicing operation to a result of applying the MRC operation, e.g., as indicated at block 310.

According to some demonstrative embodiments of the invention, a hypothesis set of values, denoted $\underline{s}$, representing a hypothesis of the $N_{Tx}$ transmitted signals may include the set of hypothetical values $\underline{s}_R$ and the hypothetical value $\hat{s}_1(\underline{s}_R)$.

As indicated at block 312, the method may also include determining a distance value corresponding to the hypothesis set $\underline{s}$. For example, estimator 212 may determine the distance value $d_{\underline{s}}^2$, e.g., according to Equation 8.

According to some demonstrative embodiments of the invention, as indicated at block 314, the method may also include repeating the operations of blocks 302, 304, and/or 312 to determine a plurality of distance values corresponding to a plurality of hypothesis sets including a plurality of the sets of the values $\underline{s}_R$ representing a plurality of available constellation combinations of the subset of the $N_{Tx}$ signals, respectively, and a respective plurality of the values $\hat{s}_1(\underline{s}_R)$. For example, counter 202 may assign $M^{N_{Tx}-1}$ sets of $\underline{s}_R$ values corresponding to $M^{N_{Tx}-1}$ constellation combinations of $N_{Tx-1}$ signals, e.g., if the subset of transmitted signals includes $N_{Tx-1}$ signals of the $N_{Tx}$ transmitted signals, as described above. Accordingly, generator 204 may generate $M^{N_{Tx}-1}$ hypothetical values $\hat{s}_1(\underline{s}_R)$ corresponding to the $M^{N_{Tx}-1}$ sets; and/or estimator 212 may determine $M^{N_{Tx}-1}$ distance values corresponding to $M^{N_{Tx}-1}$ hypothesis sets $\underline{s}$, respectively, e.g., as described above.

As indicated at block 316, the method may also include selecting one of the $M^{N_{Tx}-1}$ hypothesis sets based on any suitable criteria For example, selector 214 may select the set $\underline{s}$ resulting in a minimal distance value compared to the distance values resulting from other hypothesis sets, e.g., as described above.

Some demonstrative embodiments of the invention, e.g., as described above with reference to FIGS. 2 and/or 3, relate to applying the MRC operation one or more times to one or more of the sets of hypothetical values $\underline{s}_R$, respectively, e.g., after determining the hypothetical value x and before applying the slicing operation. However, according to other demonstrative embodiments of the invention, the MRC operation may be performed, e.g., once, for example, before assigning the hypothetical values $\underline{s}_R$ to the selected subset of transmitted signals, e.g., as described below.

According to some demonstrative embodiments of the invention, $N_{Tx}$ antennas 110 (FIG. 1) may include two antennas. Accordingly, the $N_{Tx}$ transmitted signals may include two transmitted signals; the set of one or more hypothetical values $\underline{s}_R$ assigned to the subset of the two signals may include a value, denoted $s_0$, assigned to a first signal of the two transmitted signals; the selected signal may include a second signal, denoted $s_1$, of the two transmitted signals; the channel matrix H may include a $N_R \times 2$ matrix having first and second columns, denoted $\underline{h}_0$ and $\underline{h}_1$, respectively, corresponding to the first and second transmitted signals, respectively. A hypothetical value of the second signal, denoted $\hat{s}_1(s_0)$ may be determined, for example, as follows:

$$\hat{s}_1(s_0) = \text{slice}\left[(\underline{h}_1^* \underline{h}_1)^{-1} \underline{h}_1^* (\underline{y} - \underline{h}_0 s_0)\right] \quad (9)$$

The distance value corresponding to the hypothesis set $\underline{s}$ including the values $s_1$ and $s_0$ may be determined, for example, as follows:

$$d_{\underline{s}}^2 = \|\underline{y} - H\underline{s}\|^2 = \|\underline{y} - \underline{h}_0 s_0 - \underline{h}_1 s_1\|^2 \quad (10)$$

According to some demonstrative embodiments of the invention, the following values may be determined, e.g., before assigning the hypothetical value $s_0$:

$$\underline{a}^* = (\underline{h}_1^* \underline{h}_1)^{-1} \underline{h}_1^* \quad (11)$$

$$\Delta z = -\underline{a}^* \cdot \underline{h}_0 \cdot \Delta \quad (12)$$

wherein $\Delta$ denotes a constellation spacing, e.g., $\Delta = 2$, as is known in the art. The following variables may be defined:

$$\underline{b}_{x,y} = \underline{y} - \underline{h}_0 \cdot s_0 \quad (13)$$

$$z_{x,y} = (\underline{h}_1^* \underline{h}_1)^{-1} \underline{h}_1^* (\underline{y} - \underline{h}_0 s_0) = \underline{a}^* \cdot \underline{b}_{x,y} \quad (14)$$

According to some demonstrative embodiments of the invention, the values of $s_0$ and/or $s_1$ may be determined according to the following pseudo-code algorithm:

Algorithm 1

Define c(x,y) as the constellation points
initialize b:$b_{0,0}$ = y − $h_0$ · c(0,0) (complex vector)
initialize z: $z_{0,0}$ = $a^*$ · $b_{0,0}$ (complex number)
for x=0 to m−1 // m=sqrt(M)
{
  for y=0 to m−1
  {
    $s_1$ = slice($z_{x,y}$)
    $d_{x,y}^2$ = ||$b_{x,y}$ − $h_1 s_1$||$^2$
    $b_{x,y+1}$ = $b_{x,y}$ − j · $h_0$ · $\Delta$
    $z_{x,y+1}$ = $z_{x,y}$ + j · $\Delta z$
  }
  $b_{x+1,0}$ = $b_{x,0}$ − $h_0$ · $\Delta$
  $z_{x+1,y}$ = $z_{x,y}$ + $\Delta z$
}
select $s_0$, $s_1$ corresponding to minimal $d_{x,y}$ Algorithm 1 may be expressed in various languages, circuits or firmware structures, and/or may be implemented by any suitable software, hardware, and/or firmware, e.g., as described below.

Figure 4:
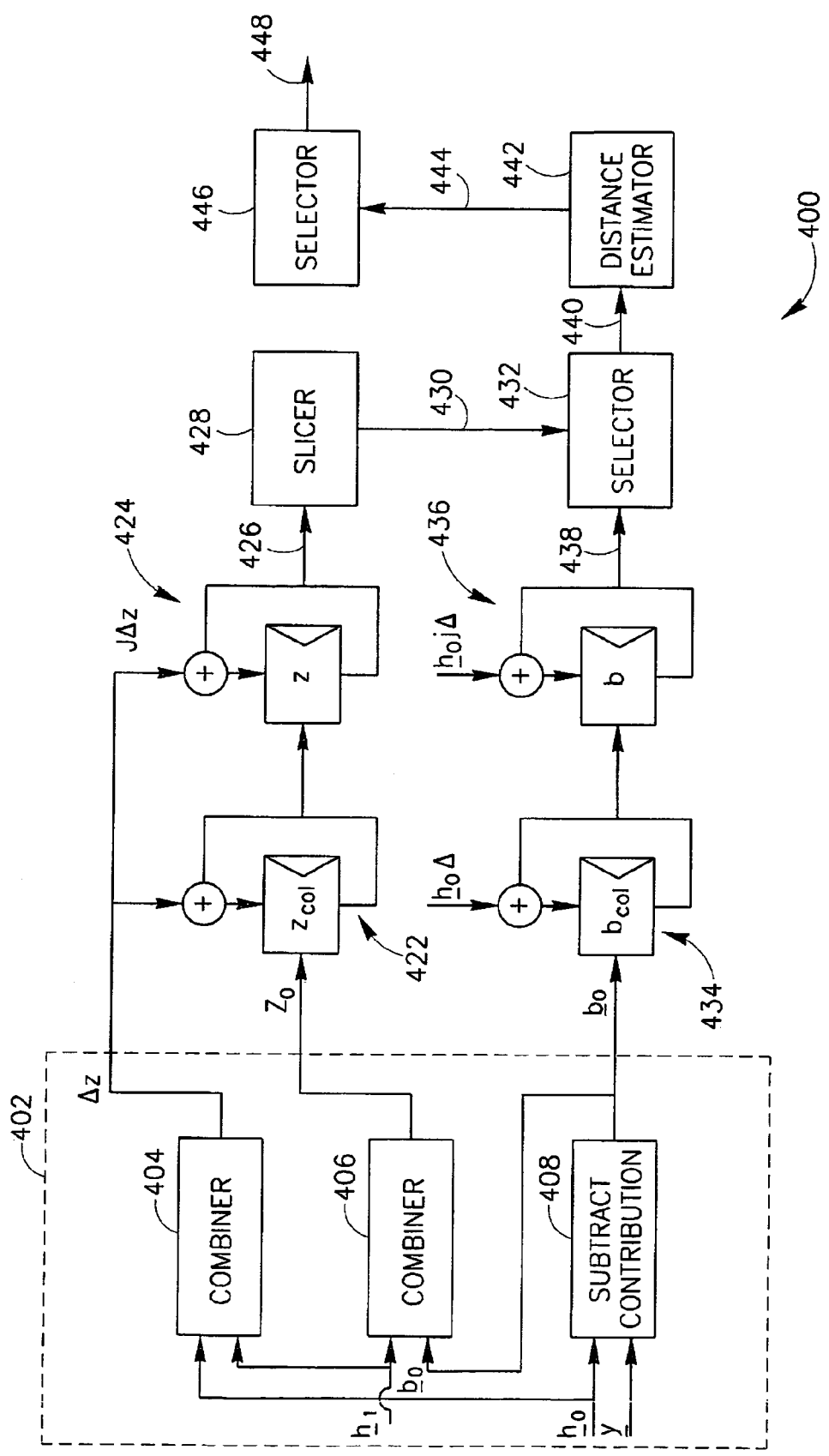
FIG. 4 is a schematic illustration of a decoder in accordance with another demonstrative embodiment of the invention.

Reference is made to FIG. 4, which schematically illustrates a decoder 400 in accordance with another demonstrative embodiment of the invention. Although the invention is not limited in this respect, decoder 400 may perform the functionality of decoder 120 (FIG. 1). Although the invention is not limited in this respect, decoder 400 may perform one or more operations of Algorithm 1, e.g., as described below.

According to some demonstrative embodiments of the invention, decoder 400 may generate, for example, an output 448 including selected values of $s_0$ and/or $s_1$, based on the received signals $\underline{y}$, the channel estimation $\underline{h}_0$, and/or the channel estimation $\underline{h}_1$, e.g., as described below.

According to some demonstrative embodiments of the invention, decoder 400 may include, for example, a preprocessor 402 to determine the value of $\Delta z$, a first initial value, denoted $z_0$, and/or a second initial value, denoted $b_0$. For example, preprocessor 402 may determine the values $z_0$ and/or $b_0$ as follows:

$$b_0 = \underline{y} - \underline{h}_0 \cdot c_{00} \quad (15)$$

$$z_0 = (\underline{h}_1^* \underline{h}_1)^{-1} \underline{h}_1^* \cdot \underline{b}_0 \quad (16)$$

Preprocessor 402 may include, for example, a first combiner 404 to determine the value $\Delta z$, e.g., by applying a MRC operation to the channel estimation $\underline{h}_0$ using the channel estimation $\underline{h}_1$, e.g., according to Equation 12; a subtractor 408 to subtract the channel estimation $\underline{h}_0$ from signals $\underline{y}$, e.g., according to Equation 15; and/or a second combiner 406 to apply a MRC operation to the value $b_0$ using the channel estimation $\underline{h}_1$, e.g., according to Equation 16.

According to some demonstrative embodiments of the invention, decoder 400 may also include a first counter 422 to propagate the value of $z_{x,y}$ by $\Delta$, e.g., for each column of the QAM constellation. For example, counter 422 may propagate the value of $z_{x,y}$ as follows:

$$z_{x+1,y} = z_{x,y} + \Delta z \quad (17)$$

According to some demonstrative embodiments of the invention, decoder 400 may also include a second counter 424 to propagate the value of $z_{x,y}$ by $j \cdot \Delta z$, e.g., within a column of the QAM constellation. For example, counter 424 may propagate the value of $z_{x,y}$ as follows:

$$z_{x,y+1} = z_{x,y} + j \cdot \Delta z \quad (18)$$

Accordingly, an output 426 of counter 424 may include the value of $z_{x,y}$, for example, according to Equation 14.

According to some demonstrative embodiments of the invention, decoder 400 may also include a slicer 428, e.g., a QAM slicer, to apply a slicing operation to output 426, e.g., according to Equation 9. Accordingly, an output 430 of slicer 428 may include the hypothetical value $\hat{s}_1(s_0)$.

According to some demonstrative embodiments of the invention, decoder 400 may also include a third counter 434 to propagate the value of $\underline{b}_{x,y}$ by $\underline{h}_0 \cdot \Delta$, e.g., for each column of the QAM constellation. For example, counter 434 may propagate the value of $\underline{b}_{x,y}$ as follows:

$$\underline{b}_{x+1,0} = \underline{b}_{x,0} - \underline{h}_0 \cdot \Delta \qquad (19)$$

According to some demonstrative embodiments of the invention, decoder 400 may also include a fourth counter 436 to propagate the value of $\underline{b}_{x,y}$ by $\underline{h}_0 \cdot j\Delta$, e.g., within a column of the QAM constellation. For example, counter 436 may propagate the value of $\underline{b}_{x,y}$ as follows:

$$\underline{b}_{x,y+1} = \underline{b}_{x,y} - j \cdot \underline{h}_0 \cdot \Delta \qquad (20)$$

Accordingly, an output 438 of counter 436 may include the value of $\underline{b}_{x,y}$, for example, according to Equation 13.

According to some demonstrative embodiments of the invention, decoder 400 may also include a subtractor 432 to determine a hypothetical contribution value, denoted $\underline{e}$, based on the hypothetical value $\hat{s}_1(s_0)$, and/or the value $\underline{b}_{x,y}$. For example, subtractor 432 may determine $\underline{e}$ as follows:

$$\underline{e} = \underline{b}_{x,y} - \underline{h}_1 \hat{s}_1(s_0) \qquad (21)$$

According to some demonstrative embodiments of the invention, decoder 400 may also include a distance estimator 442 to determine the distance value $d_s$, e.g., based on the value $\underline{e}$. For example, estimator 442 may generate an output 444 corresponding to the value $d_s$ as follows:

$$d_s \approx \|\underline{e}\| \qquad (22)$$

According to some demonstrative embodiments of the invention, decoder 400 may also include a selector 446 to maintain a plurality of the distance values $d_s$ corresponding to a plurality of hypothesis sets $\underline{s}$ including the different constellation values of $s_0$ and $s_1$; and to select one of the values of $s_0$ and a corresponding one of the values of $s_1$, by applying any suitable criteria to the distance values $d_s$. For example, selector 446 may select the values of $s_0$ and $\hat{s}_1$ corresponding to a minimal distance value.

Some demonstrative embodiments of the invention may refer to decoding a transmission including two spatial streams transmitted by $N_{Tx}=2$ transmission antennas, e.g., as described above with reference to FIG. 4. However, it will be appreciated by those of ordinary skill in the art that other embodiments of the invention may include decoding a transmission including any other suitable number of spatial streams transmitted by any suitable number, e.g., $N_{Tx}>2$, of transmission antennas. For example, decoder 400 may be modified to decode transmissions of $N_{Tx}>2$ transmission antennas.

Some demonstrative embodiments of the invention are described above with reference to a decoder, e.g., decoder 200 (FIG. 2) and/or decoder 400 (FIG. 4), able to determine a selected set of values $\underline{s}$ based on the plurality of sets of hypothetical values $s_R$ and the plurality of respective values $\hat{s}_1(s_R)$. However, some embodiments of the invention may relate to a decoder able to determine, additionally or alternatively, any other suitable value, e.g., one or more metric values, based on one or more sets of hypothetical values $s_R$, and/or one or more values $\hat{s}_1(s_R)$, respectively, e.g., as described below.

Figure 5:
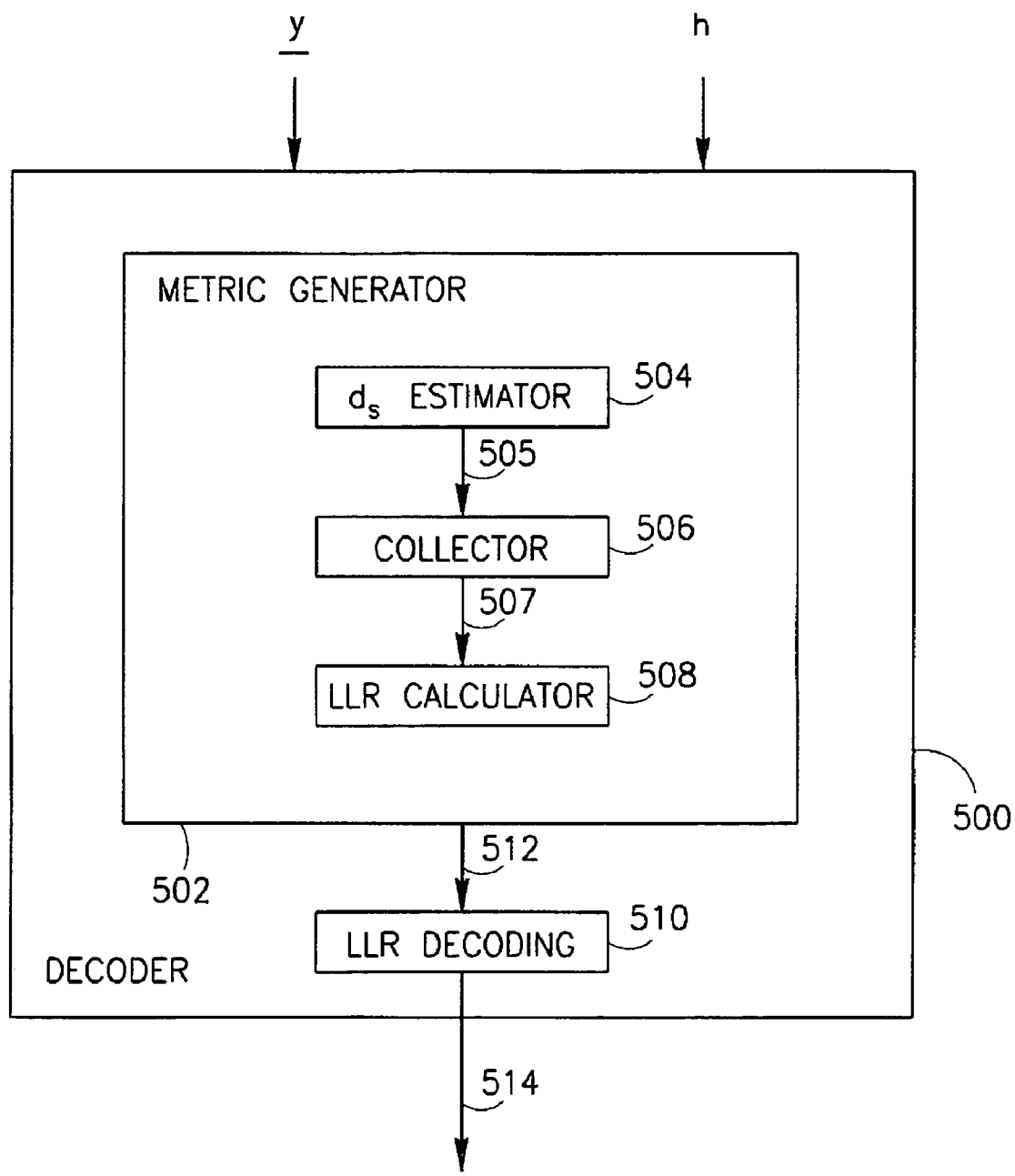
FIG. 5 is a schematic illustration of a decoder in accordance with yet another demonstrative embodiment of the invention.

Reference is now made to FIG. 5, which schematically illustrates a decoder 500 in accordance with yet another demonstrative embodiment of the invention. Although the invention is not limited in this respect, decoder 500 may perform the functionality of decoder 120 (FIG. 1).

According to some demonstrative embodiments of the invention, decoder 500 may include, for example, a metric generator 502 to determine a set of metric values 512, e.g., including one or more Log-Likelihood-Ratio (LLR) values, based on the received signals $\underline{y}$, and the channel matrix H, e.g., as described below. Decoder 500 may also include a metric decoder 510 to determine values 514 representing the $N_{Tx}$ transmitted signals, e.g., based on values 512. Metric decoder 510 may include any suitable decoder, for example, a FEC decoder, e.g., a Viterbi decoder as is known in the art.

A signal of the set of $N_{Rx}$ received signals $\underline{y}$ may be represented by a predefined number of bits, e.g., $\log_2(M)$ bits, as is known in the art.

According to some demonstrative embodiments of the invention, metric generator 502 may generate one or more of values 512 based on the plurality of hypothetical values $s_1$, and/or the plurality of sets of hypothetical values $s_R$, e.g., as described below.

According to some demonstrative embodiments of the invention, metric generator 502 may determine a LLR value, denoted $LLR_i(n)$, corresponding to an i-th bit of an n-th signal of the $N_{Tx}$ transmitted signals, wherein i=1 . . . $\log_2(M)$, for example, as follows:

$$LLR_i(n) = \min_{\substack{s_R \in Z_{i,n}^+ \\ s_1 = \hat{s}_1(s_R)}} (d_s^2) - \min_{\substack{s_R \in Z_{i,n}^- \\ s_1 = \hat{s}_1(s_R)}} (d_s^2) \qquad (23)$$

wherein $Z_{i,n}^+$ denotes a set of symbol vectors of constellation points wherein the i-th bit of the n-th signal has a first value, e.g., one; $Z_{i,n}^-$ denotes a set of symbol vectors of constellation points wherein the i-th bit of the n-th signal has a second value, e.g., zero; and wherein n relates to the selected subset of the transmitted signals. For example, n may be in the range of n=2 . . . $N_{Tx}$, e.g., if the selected subset does not include the first signal of the $N_{Tx}$ transmitted signals.

According to some demonstrative embodiments of the invention, metric generator 502 may determine a plurality of LLR values corresponding to the plurality of signals of a first selected subset excluding the selected signal $s_1$, e.g., according to Equation 23. Accordingly, metric generator 502 may perform $M^{N_{Tx}-1}$ hypotheses to determine LLR values corresponding to the first selected subset of the transmitted signals. Metric generator 502 may also determine LLR values corresponding to a second selected subset of the transmitted signals including the selected signal $s_1$. For example, metric generator 502 may determine the LLR values according to Equation 23, wherein n relates to the second subset, e.g., n=1 . . . u-1 u+1 . . . $N_{Tx}$, wherein u is selected such that the second subset includes signal $s_1$. Accordingly, metric generator 502 may perform $M^{N_{Tx}-1}$ additional hypotheses to determine LLR values corresponding to the second subset of the transmitted signals. Thus, metric generator 502 may perform, for example, $2M^{N_{Tx}-1}$ hypotheses to determine values 512.

According to some demonstrative embodiments of the invention, metric generator 502 may include a distance estimator 504 to determine a plurality of distance values 505 corresponding to the plurality of sets of hypothetical values $\underline{s}_R$, respectively, e.g., according to Equation 10. Distance estimator 504 may include, for example, preprocessor 402, counter 422, counter 424, counter 434, counter 436, slicer 428, subtractor 432, and/or distance estimator 442, as are described above with reference to FIG. 4. Distance estimator may include any other suitable estimator, e.g., including counter 202, hypothesis generator 204, and/or estimator 212, as are described above with reference to FIG. 2.

According to some demonstrative embodiments of the invention, metric generator 502 may also include a collector 506 to collect a plurality of minimal distance values, denoted $d_{min}^{(p)}[k]$, corresponding to a k-th bit, wherein p=0,1. For example, collector 506 may generate an output 507 including the following minimal distance values:

$$d_{min}^{(0)}[k] = \min(d_{\underline{s}}|\underline{s}:\text{bit}k=0)$$

$$d_{min}^{(1)}[k] = \min(d_{\underline{s}}|\underline{s}:\text{bit}k=1) \quad (24)$$

According to some demonstrative embodiments of the invention, metric generator 502 may also include a LLR calculator 508 to generate values 512. For example, calculator 508 may generate a LLR value, denoted LLR[k], corresponding to the k-th bit, e.g., as follows:

$$LLR[k] = d_{min}^{(0)}[k]^2 - d_{min}^{(1)}[k]^2 \quad (25)$$

Figure 6:
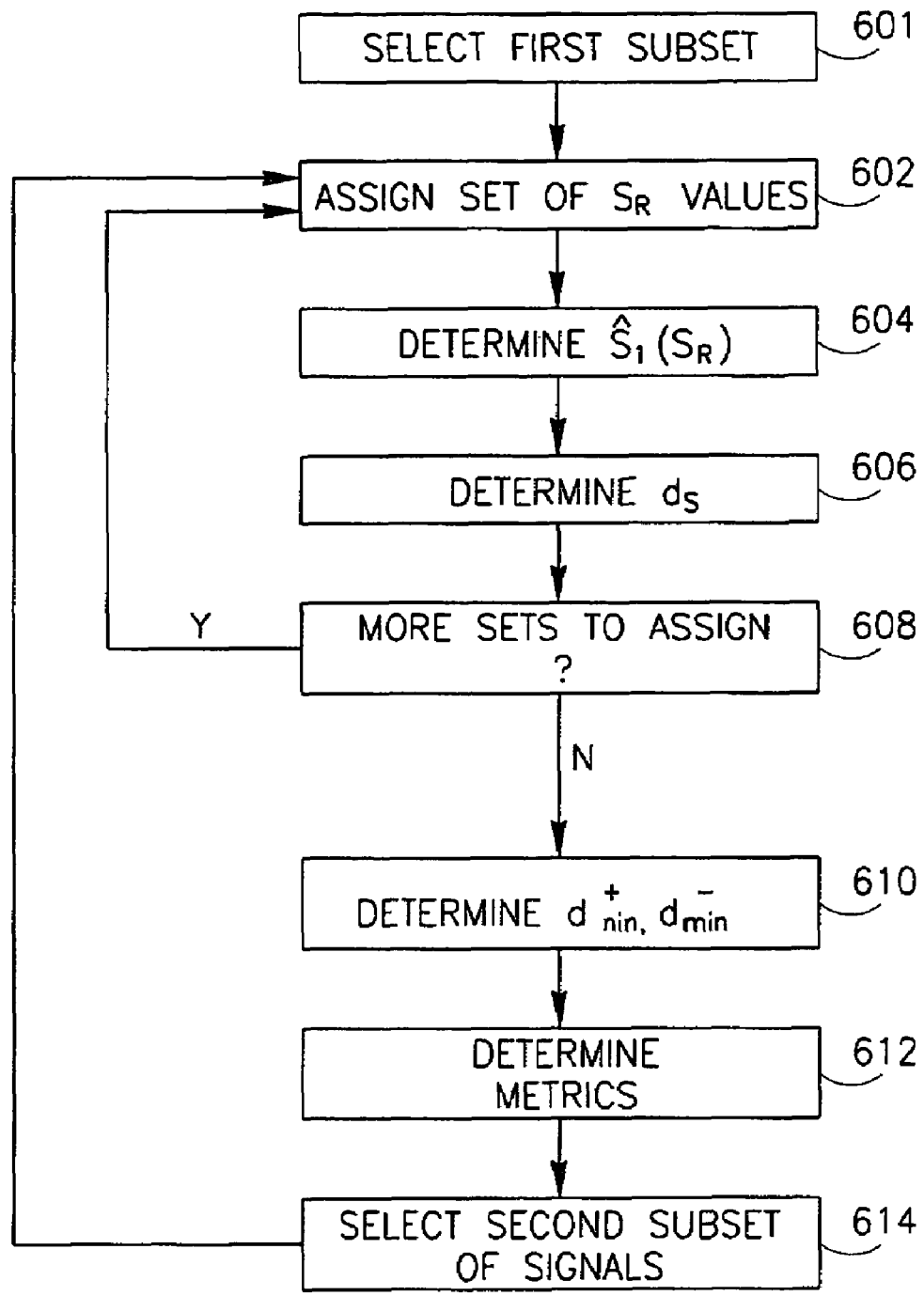
FIG. 6 is a schematic flow-chart illustration of a method of determining metric values in accordance with some demonstrative embodiments of the invention.

Reference is also made to FIG. 6, which schematically illustrates a method of determining metric values in accordance with some demonstrative embodiments of the invention. Although the invention is not limited in this respect, one or more operations of the method of FIG. 6 may be performed by metric generator 502, e.g., to determine one or more of metrics 512.

As indicated at block 601, the method may include selecting a first subset of the $N_{Tx}$ transmitted signals, e.g., which does not include at least one selected signal of the transmitted signals. For example, metric generator 502 may select the first subset, e.g., as described above.

As indicated at block 602, the method may include assigning a set of one or more hypothetical values to the selected subset. For example, estimator 504 may assign one or more hypothetical values $\underline{s}_R$ to one or more of the $N_{Tx}$ transmitted signals, respectively, e.g., as described above.

As indicated at block 604, the method may also include determining a hypothetical value of the selected signal based on the set of assigned hypothetical values. For example, estimator 504 may determine the value of $\hat{s}_1(\underline{s}_R)$, e.g., based on Equation 7.

As indicated at block 606, the method may also include determining a distance value corresponding to the values $\underline{s}_R$ and/or $\hat{s}_1(\underline{s}_R)$. For example, estimator 504 may determine the distance value $d_{\underline{s}}^2$, e.g., according to Equation 8 or 10.

As indicated at block 608, the method may include repeating the operations of blocks 602, 604, and/or 606 to determine a plurality of distance values corresponding to a plurality of hypothesis sets including a plurality of the sets of the values $\underline{s}_R$ representing a plurality of available constellation combinations of the selected subset, respectively, and a respective plurality of the values $\hat{s}_1(\underline{s}_R)$, e.g., as described above with reference to FIG. 3.

As indicated at block 610, the method may also include determining the values $d_{min}^{(p)}[k]$. For example, collector 506 may generate output 507 according to Equation 24.

As indicated at block 612, the method may also include determining one or more metrics corresponding to the signals of the selected subset. For example, calculator 508 may determine one or more of values 512, e.g., according to Equation 25.

As indicated at block 614, the method may also include selecting a second subset of the transmitted signals, e.g., not including the selected signal; and repeating the operations of blocks 602, 604, 606, 608, 610, 612 and/or 614 to determine one or more metrics corresponding to the selected signal. For example, metric generator 502 may select the second subset, e.g., as described above.

Some demonstrative embodiments of the invention are described above with reference to a metric generator, e.g., generator 502, able to determine values 512 by calculating a first set of LLR values corresponding to bits of the first subset of the transmitted signals, which may not include the selected signal; and calculating a second set of LLR values corresponding to bits of the second subset of the transmitted signals including the selected signal, e.g., according to Equation 23. However, it will be appreciated by those of ordinary skill in the art that according to other embodiments of the invention the metric generator may determine one or more of the LLR values by applying any other suitable algorithm or operation to one or more hypothetical values $s_1$, which may be determined based on one or more respective sets of hypothetical values $\underline{s}_R$, e.g., as described below.

According to another demonstrative embodiment of the invention, the selected signal may be selected from the $N_{Tx}$ transmitted signals based on the values of the channel matrix H. For example, the selected signal may include an m-th signal, denoted $s_m$, of the $N_{Tx}$ signals, which may correspond to an m-th column of the matrix H, denoted $\underline{h}_m$. The value of m may be determined, for example, as follows:

$$m = \underset{m}{\operatorname{argmax}} \|\underline{h}_m\|^2 \quad (26)$$

A plurality of hypothetical values, denoted $\hat{S}_m(\underline{s}_R)$ corresponding to the selected signal may be determined, for example, based on a plurality of sets of hypothetical values $\underline{s}_R$ assigned to the subset of $N_{Tx-1}$ transmitted signals excluding the selected signal, e.g., as follows:

$$\hat{s}_m(\underline{s}_R) = \text{slice}\left[(h_m^* h_m)^{-1} h_m^*(\underline{y} - H_R \underline{s}_R)\right] \quad (27)$$

The following set of symbols may be defined:

$$Z' = \{(\underline{s}_R, \hat{s}_m) | \underline{s}_R \in Y, \hat{s}_m(\underline{s}_R) = \text{slice}\left[(h_m^* h_m)^{-1} h_m^*(\underline{y} - H_R \underline{s}_R)\right]\} \quad (28)$$

The LLR value may be determined as follows:

$$LLR_i(n) = \min_{s \in Z'^+_{i,n}} (d_s^2) - \min_{s \in Z'^-_{i,n}} (d_s^2) \quad (29)$$

wherein the distance values $d_s$ may be determined, for example, according to Equation 8; and wherein n=1 ... $N_{Tx}$. If $Z'^+_{i,n}$ is an empty set, then the corresponding distance value $d_s$ may be calculated over a larger set, e.g., the set $$s \in \bigcup_{i=1}^{\log_2 M} Z'^+_{i,n}.$$

If the set $$\bigcup_{i=1}^{\log_2 M} Z'^{+}_{i,n}$$

is empty, then the distance value may be calculated over the entire set Z'. If $Z^{1-}_{i,n}$ is an empty set, then the corresponding distance value may be calculated over a larger set, e.g., the set $$s \in \bigcup_{i=1}^{\log_2 M} Z'^{-}_{i,n}.$$

If the set $$\bigcup_{i=1}^{\log_2 M} Z^{-}_{i,n}$$

is empty, then the distance value may be calculated over the entire set Z'.

According to yet another demonstrative embodiment of the invention, one or more LLR values corresponding to the received signals $\underline{y}$ may be determined by applying one or more zero-forcing (ZF) equalizing operations to the received signals $\underline{y}$, e.g., according to the following Algorithm:

1. Apply ZF equalizer to the signals $\underline{y}$ to determine an equalized set:
   $\underline{r} = (H^H H)^{-1} H^H \underline{y}$, wherein $H^H$ denotes a complex conjugate transpose applied to the matrix H.
2. Repeat the following operations for $j = 1 \ldots N_{TX}$ times:
   a. Calculate post-ZF SINR for k-th data stream:

$$SINR_k = \frac{SNR}{[(H^H H)^{-1}]_{kk}}$$

b. Select m-th signal from the $N_{Tx}$ transmitted signals corresponding to the maximum SINR:

$$m_j = \underset{m}{\operatorname{argmax}} SINR_m.$$

c. Define: $Q_j$=set of G constellation points closet to the $m_j$-th ZF output $\underline{r}(m_j)$, wherein G is predetermined number. Large G may increase performance.
   d. For each $s_{m_j} \in Q_j$, subtract contribution due to $s_{m_j}$, e.g., $\underline{y} = \underline{y} - h_{m_j} s_{m_j}$. Define the channel matrix: $H = \lfloor h_1 \ldots h_{m_j-1} \, 0 \, h_{m_j+1} \ldots h_{N_{TX}} \rfloor$
   e. Apply ZF equalizer to $\underline{y}$.
3. Z=set of symbol vectors of $N_{TX}$ signals $Z = \{(s_{m_1}, \ldots s_{m_{N_{TX}}})\}$. The size of Z is $G^{N_{TX}-1}$.
4. Determine LLR for i-th bit of n-th signal:

$$LLR_i(n) = \min_{s \in Z^+_{i,n}} (d_s^2) - \min_{s \in Z^-_{i,n}} (d_s^2).$$

5. If $Z_{i,n}^+$ or $Z_{i,n}^-$ are empty sets, then calculate LLR over a larger set, e.g., as described above.

Algorithm 2

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method comprising:
   determining by a hypothesis generator of a decoder in a communication device, a plurality of hypothetical values of a transmitted signal of a set of transmitted signals based on a plurality of respective sets of hypothetical values assigned to a subset of said set of transmitted signals; and
   selecting one of the plurality of hypothetical values of said transmitted signal and a corresponding set of said plurality of sets based on a predefined criterion, wherein said predefined criterion relates to a plurality of distance values corresponding to said plurality of hypothetical values, said plurality of sets of hypothetical values, and two or more received signals.

2. The method of claim 1 comprising:
   determining at least one hypothetical value of a first selected signal of the set of transmitted signals based on at least one respective set of hypothetical values assigned to a first subset of said set of transmitted signals; and
   determining at least one hypothetical value of a second selected signal of the set of transmitted signals based on at least one respective set of hypothetical values assigned to a second subset of said set of transmitted signals, wherein said second subset includes said first selected signal.

3. The method of claim 2 comprising:
   generating a set of values representing said first subset of transmitted signals based on the hypothetical value of said first selected signal, and the set of hypothetical values assigned to said first subset; and
   generating a set of values representing said first selected signal based on the hypothetical value of said second selected signal, and the set of hypothetical values assigned to said second subset.

4. The method of claim 1 comprising generating a set of values representing said set of transmitted signals based on the hypothetical value of said transmitted signal and the set of hypothetical values.

5. The method of claim 1, wherein said set of transmitted signals comprises n transmitted signals, and wherein said set of hypothetical values comprises a set of n−1 hypothetical values assigned to n−1 signals of said set of transmitted signals.

6. The method of claim 1, wherein determining said plurality of hypothetical values of said transmitted signal comprises determining said plurality of hypothetical values based on plurality of respective sets of hypothetical values assigned to a subset of said transmitted signals not including said transmitted signal.

7. A method comprising:
determining by a hypothesis generator of a decoder in a communication device, a plurality of hypothetical values of a transmitted signal of a set of transmitted signals based on a plurality of respective sets of hypothetical values assigned to a subset of said set of transmitted signals; and
selecting one of the plurality of hypothetical values of said transmitted signal and a corresponding set of said plurality of sets of hypothetical values based on a predefined criterion, wherein determining said plurality of hypothetical values comprises applying a predefined function to said sets of hypothetical values and values of two or more received signals, wherein applying said function comprises determining a maximum likelihood solution based on said sets of hypothetical values and the values of said two or more received signals.

8. A method comprising:
determining by a hypothesis generator of a decoder in a communication device, a plurality of hypothetical values of a transmitted signal of a set of transmitted signals based on a plurality of respective sets of hypothetical values assigned to a subset of said set of transmitted signals; and
selecting one of the plurality of hypothetical values of said transmitted signal and a corresponding set of said plurality of sets of hypothetical values based on a predefined criterion, wherein determining said plurality of hypothetical values comprises applying a predefined function to said sets of hypothetical values and values of two or more received signals, wherein applying said function comprises:
subtracting from the values of said two or more received signals products of said set of hypothetical values and one or more channel values;
applying a maximum-ratio-combining operation to a result of said subtracting; and
applying a slicing operation to a result of applying said maximum-ratio-combining operation.

9. A method comprising:
determining by a hypothesis generator of a decoder in a communication device, a plurality of hypothetical values of a transmitted signal of a set of transmitted signals based on a plurality of respective sets of hypothetical values assigned to a subset of said set of transmitted signals;
selecting one of the plurality of hypothetical values of said transmitted signal and a corresponding set of said plurality of sets based on a predefined criterion; and
generating a set of one or more likelihood ratio values based on the selected hypothetical values of said transmitted signal and the corresponding set of said plurality of sets of hypothetical values.

10. An apparatus comprising:
a hypothesis generator to determine a plurality of hypothetical values of a transmitted signal of a set of transmitted signals based on a plurality of respective sets of hypothetical values assigned to a subset of said set of transmitted signals; and
a selector to select one of said plurality of hypothetical values of said transmitted signal and a corresponding set of said plurality of sets based on a predefined criterion, wherein said predefined criterion relates to a plurality of distance values corresponding to said plurality of hypothetical values, said plurality of sets of hypothetical values, and two or more received signals.

11. The apparatus of claim 10, wherein said hypothesis generator is able to:
determine at least one hypothetical value of a first selected signal of the set of transmitted signals based on at least one respective set of hypothetical values assigned to a first subset of said set of transmitted signals; and
determine at least one hypothetical value of a second selected signal of the set of transmitted signals based on at least one respective set of hypothetical values assigned to a second subset of said set of transmitted signals, wherein said second subset includes said first selected signal.

12. The apparatus of claim 11 comprising a decoder to:
generate a set of values representing said first subset of transmitted signals based on the hypothetical value of said first selected signal, and the set of hypothetical values assigned to said first subset; and
generate a set of values representing said first selected signal based on the hypothetical value of said second selected signal, and the set of hypothetical values assigned to said second subset.

13. The apparatus of claim 10 comprising a decoder to generate a set of values representing said set of transmitted signals based on the hypothetical value of said transmitted signal and the set of hypothetical values.

14. The apparatus of claim 10, wherein said set of transmitted signals comprises n transmitted signals, and wherein said set of hypothetical values comprises a set of n−1 hypothetical values assigned to n−1 signals of said set of transmitted signals.

15. An apparatus comprising:
a hypothesis generator to determine a plurality of hypothetical values of a transmitted signal of a set of transmitted signals based on a plurality of respective sets of hypothetical values assigned to a subset of said set of transmitted signals; and
a selector to select one of said plurality of hypothetical values of said transmitted signal and a corresponding set of said plurality of sets based on a predefined criterion, wherein said hypothesis generator is to apply a predefined function to said sets of hypothetical values and values of two or more received signals, wherein said hypothesis generator is to determine a maximum likelihood solution based on said set of hypothetical values and the values of said two or more received signals.

16. An apparatus comprising:
a hypothesis generator to determine a plurality of hypothetical values of a transmitted signal of a set of transmitted signals based on a plurality of respective sets of hypothetical values assigned to a subset of said set of transmitted signals; and
a selector to select one of said plurality of hypothetical values of said transmitted signal and a corresponding set of said plurality of sets based on a predefined criterion, wherein said hypothesis generator is to apply a predefined function to said sets of hypothetical values and values of two or more received signals, wherein said hypothesis generator comprises:
a subtractor to subtract from the values of said two or more received signals products of said set of hypothetical values and one or more channel values;

a combiner to apply a maximum-ratio-combining operation to an output of said subtractor; and a slicer to apply a slicing operation to an output of said combiner.

17. An apparatus comprising:

a hypothesis generator to determine a plurality of hypothetical values of a transmitted signal of a set of transmitted signals based on a plurality of respective sets of hypothetical values assigned to a subset of said set of transmitted signals;

a selector to select one of said plurality of hypothetical values of said transmitted signal and a corresponding set of said plurality of sets of hypothetical values based on a predefined criterion; and a metric generator to generate a set of one or more likelihood ratio values based on the hypothetical value of said transmitted signal and the set of hypothetical values.

* * * * *